UNITED STATES PATENT OFFICE.

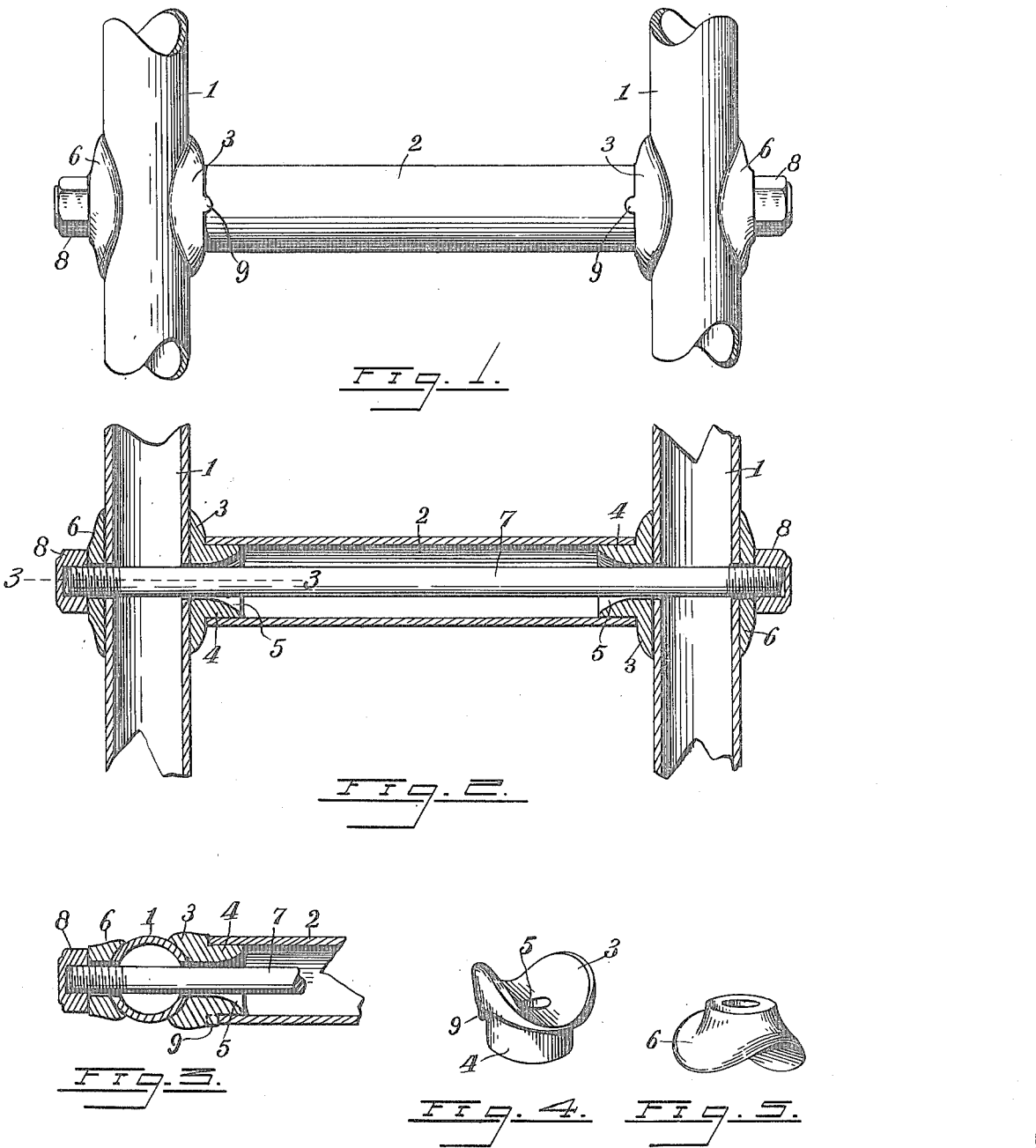

AUGUSTIN HENDRICKS AND WILLIAM P. BROCKSCHMIDT, OF GRAND RAPIDS, MICHIGAN; SAID BROCKSCHMIDT ASSIGNOR TO SAID HENDRICKS.

JOINT FOR TUBULAR STRUCTURES.

1,136,010.            Specification of Letters Patent.            Patented Apr. 20, 1915.

Application filed November 21, 1910. Serial No. 593,501.

*To all whom it may concern:*

Be it known that we, AUGUSTIN HENDRICKS and WILLIAM P. BROCKSCHMIDT, citizens of the United States of America, residing at Grand Rapids, in the county of Kent and State of Michigan, have invented certain new and useful Improvements in Joints for Tubular Structures; and we do hereby declare the following to be a full, clear, and exact description of the invention, such as will enable others skilled in the art to which it appertains to make and use the same.

Our invention relates to improvements in joints for tubular structures, such as the frame of metallic furniture, metal towers and various other analogous structures, and its object is to provide a strong substantial joint for such structures without necessity for brazing or soldering, and that can be readily assembled or taken apart as occasion requires, and to provide the device with various new and useful features hereinafter more fully described and particularly pointed out in the claim.

Our invention consists essentially of tubular upright members spaced apart, a connecting tubular member extending therebetween, saddles interposed between the ends of the connecting member and said upright members having central openings and concave surfaces adapted to engage said members, washers opposite the saddles, between which saddles and washers the upright members are clamped, and a bolt extending through all of these described parts to bind the same firmly together, as will more fully appear by reference to the accompanying drawings in which:

Figure 1 is a side elevation of a device embodying our invention; Fig. 2 the same shown in vertical section; Fig. 3 a horizontal section of the same on the line 3—3 of Fig. 2; Fig. 4 a perspective detail of one of the saddles; and Fig. 5 the same of one of the washers.

Like numbers refer to like parts in all of the figures.

1—1 refer to the upright tubular members of a structure such as articles of furniture, of a metal tower, or other similar structure. The upright tubes may be adjusted vertical or inclined as preferred. Our invention relates to connecting the same to each other by means of a transverse member 2, which may be disposed horizontally or inclined as the work may require. The device herein shown has the upright members 1 vertical, and the connecting member 2 horizontal. Interposed between the respective ends of the horizontal member 2, and adjacent sides of the uprights 1, are saddles 3 having concave surfaces adapted to fit the adjacent surfaces of the upright members and partially surrounding the same and also provided with suitable annular seats against which the ends of the member 2 abut. The saddle is also provided with a boss 4 having a central opening to receive the bolt 7. This opening is flared or bell shape to guide the bolt to place. This boss 4 extends within the end of the tube 2, and securely holds the same concentric with the bolt 7. Opposite to the saddle is a washer 6 to engage and partially embrace the upright member 1 and also having an axial opening to receive the bolt. Openings are made through the uprights 1 in line with the openings of the saddles and washers, and the bolt 7 extends through all of these parts and at its respective ends is provided with a nut 8, whereby the bolt can be tightened to firmly draw all of the said parts together, thus forming a substantial and rigid structure that can be readily taken apart or assembled as occasion may require. The openings in the uprights are made larger than the bolt, whereby the bolt will adjust laterally therein. The saddles are thus permitted to adjust longitudinally on the uprights, whereby the legs of a structure, such as a table, can be readily squared or leveled before the bolts are fully tightened.

In some structures it is desirable to hold the connecting member against accidental rotative movement to so adjust the same.

What we claim is:—

In a device such as described, spaced tubular uprights formed with alining openings, saddles engaging the inner sides of said uprights, the faces of said saddles conforming to the shape of the uprights, bosses having openings therein registering with the openings of the tubular uprights, washers disposed upon the uprights on opposite sides thereof to the saddles, said washers having openings formed therein and alining with the openings in the uprights and saddles, a tubular connecting member disposed with its ends engaging the bosses of the saddles, a tie rod having threaded ends passing through the openings in the bosses, uprights and washers, the diameter of the said tie rod being less than the diameters of the openings in the washers, uprights and saddles and the openings in the bosses being flared to guide the tie rod through said alining openings.

In testimony whereof we affix our signatures in presence of two witnesses.

AUGUSTIN HENDRICKS.
WILLIAM P. BROCKSCHMIDT.

Witnesses:
PALMER A. JONES,
HAROLD O. VAN ANTWERP.